United States Patent [19]

Gillespie et al.

[11] Patent Number: 5,835,784
[45] Date of Patent: Nov. 10, 1998

[54] SYSTEM FOR BOOTING PROCESSOR FROM REMOTE MEMORY BY PREVENTING HOST PROCESSOR FROM CONFIGURING AN ENVIRONMENT OF PROCESSOR WHILE CONFIGURING AN INTERFACE UNIT BETWEEN PROCESSOR AND REMOTE MEMORY

[75] Inventors: Byron Gillespie, Phoenix, Ariz.; Bruce Young, Tigard, Oreg.

[73] Assignee: Intel Corporation, Santa Clara, Calif.

[21] Appl. No.: 611,802

[22] Filed: Mar. 6, 1996

Related U.S. Application Data

[63] Continuation-in-part of Ser. No. 490,778, Jun. 15, 1995, Pat. No. 5,696,949.

[51] Int. Cl.⁶ .................................................. G06F 15/177
[52] U.S. Cl. .......................................... 395/830; 395/652
[58] Field of Search ..................................... 395/652, 282, 395/842, 822, 651, 280, 830; 711/206, 143; 365/230.02

[56] References Cited

U.S. PATENT DOCUMENTS

| | | | |
|---|---|---|---|
| 4,679,166 | 7/1987 | Berger et al. | 395/652 |
| 4,943,911 | 7/1990 | Kopp et al. | 395/652 |
| 5,247,629 | 9/1993 | Casamatta et al. | 711/206 |
| 5,335,329 | 8/1994 | Cox et al. | 395/282 |
| 5,450,576 | 9/1995 | Kennedy | 395/652 |
| 5,497,497 | 3/1996 | Miller et al. | 395/651 |
| 5,535,417 | 7/1996 | Baji et al. | 395/842 |
| 5,548,730 | 8/1996 | Young et al. | 395/280 |
| 5,579,277 | 11/1996 | Kelly | 365/230.02 |
| 5,586,297 | 12/1996 | Bryg et al. | 711/143 |
| 5,590,377 | 12/1996 | Smith | 395/842 |
| 5,603,051 | 2/1997 | Ezzet | 395/822 |

*Primary Examiner*—Thomas C. Lee
*Assistant Examiner*—David Ton
*Attorney, Agent, or Firm*—Blakely, Sokoloff, Taylor & Zafman

[57] ABSTRACT

A method and system for booting a first processor from a remote memory. In response to a reset signal, a processor which has no associated local memory is prevented from executing code and particularly its boot sequence. Because the first processor is prevented from initializing its environment, configuration cycles from a host processor should be prevented from configuring that environment until the first processor has booted. By preventing the host processor from configuring, the first processor environment's integrity is protected. Because the first processor has no local memory, address cycles generated to access local memory would normally go unclaimed on a local bus. An interface between the local bus and the remote memory is configured to claim the local memory address range from the local bus. Once the first processor is enabled, the local memory addresses are used to access the remote memory to return the necessary boot code.

14 Claims, 4 Drawing Sheets

| SIGNALS | PINS | DESCRIPTION |
|---|---|---|
| AD[0:31] | 32 | STANDARD PCI MULTIPLEXED ADDRESS/DATA LINES |
| C/BE[0:3]# | 4 | STANDARD PCI MULTIPLEXED COMMAND/BYTE ENABLE LINES |
| FRAME# | 1 | STANDARD PCI FRAME# LINE |
| IRDY# | 1 | STANDARD PCI IRDY# LINE |
| TRDY# | 1 | STANDARD PCI TRDY# LINE |
| DEVSEL# | 1 | STANDARD PCI DEVSEL# LINE |
| STOP# | 1 | STANDARD PCI STOP# LINE |
| LOCK# | 1 | STANDARD PCI LOCK# LINE |
| PERR# | 1 | STANDARD PCI PERR# LINE |
| SERR# | 1 | STANDARD PCI SERR# LINE |
| RESET# | 1 | STANDARD PCI RESET# LINE |
| PAR | 1 | STANDARD PCI PAR# LINE |
| REQ# | 1 | *SEB* REQUEST TO *PEB* FOR USE OF THE *SEC.* |
| GNT# | 1 | *PEB* GRANT TO *SEB* USE OF THE *SEC.* |
| SINT# | 1 | SERIALIZED INTERRUPT LINE (NOT STANDARD PCI) |
| CLK | 1 | *SEB* GENERATED CLOCK TO *PEB* FOR USE WITH THE INTERFACE *SEC.* |
| TOTAL | 50 | |

Fig. 2

SYSTEM FOR BOOTING PROCESSOR FROM REMOTE MEMORY BY PREVENTING HOST PROCESSOR FROM CONFIGURING AN ENVIRONMENT OF PROCESSOR WHILE CONFIGURING AN INTERFACE UNIT BETWEEN PROCESSOR AND REMOTE MEMORY

This is a continuation-in-part of AN APPARATUS AND METHOD FOR PROVIDING REMOTE PCI SLOT EXPANSION, Ser. No. 08/490,778 filed Jun. 16, 1995, now U.S. Pat. No. 5,696,949.

BACKGROUND OF THE INVENTION

1. Field of the Invention

The invention relates to booting a processor. More specifically, the invention relates to booting a processor from a remote memory.

2. Related Art

Intelligent input/output (I/O) processing has become increasingly common. An intelligent I/O system implies that in addition to a host processor, a lesser I/O processor is also provided to handle various I/O tasks, thereby facilitating the speed and efficiency of I/O operations. The I/O processor is typically much lower in cost and processing power than the host processor and is associated with a local memory which is typically at least partially composed of read only memory (ROM) in which the boot code for booting and initializing the I/O processor is maintained. Among the processors used as I/O processors is the JF80960 manufactured by Intel Corporation of Santa Clara, Calif. The JF80960 responds to a reset signal by placing the local ROM address of its boot code on the local bus. In response, the boot code is returned from the ROM and the JF8960 initializes itself and configures the local I/O environment. The processor and its local memory are typically provided on an I/O card for insertion into an I/O bus slot. Unfortunately, providing the local memory on the I/O card significantly increases the cost of the card. This is a concern as the market becomes increasingly cost sensitive.

The peripheral component interconnect (PCI) bus is a high performance low latency I/O bus architected to minimize system cost. PCI has quickly gained wide acceptance in the computer industry. The PCI bus standard provides for a high bandwidth and a flexibility that is independent of new processor technologies and increased processor speed. At this time, computer system architects are primarily designing speed sensitive peripherals such as graphics accelerators and small computer systems interface (SCSI) drive controllers to be utilized with the PCI bus.

The PCI specification is well defined. See particularly, PCI Local Bus Specification, rev. 2.0, Apr. 30, 1993. The specification reflects that PCI is capable of running at any frequency up to 33 MHz. This high level of possible throughput makes PCI an ideal choice for volume servers. Unfortunately, at such speed, the PCI bus can only support 3–4 slots along a single bus segment This number of slots is unacceptably low for a practical application in the volume server market. Some prior systems have addressed this problem by cascading PCI buses on the host mother board. Unfortunately, such cascading increases the cost of the basic system and still fails to provide a level of slot expansion necessary in volume servers. Moreover, such single chassis systems are not readily expandable as the user's needs change.

The volume server market has yielded another limitation not readily addressed by a single chassis system, specifically, physical space. Stated differently, current processors have enough processing power that a single processor can satisfy the processing requirements of more, for example, SCSI drives than will fit within any single chassis. Any time the number of drives exceeds this physical limitation, it will clearly be necessary to expand out of the chassis. As a practical matter, since each chassis is likely to be provided with its own I/O processor, the cost of the system could be significantly reduced if it were possible to eliminate the local memory associated with at least some of the I/O processors.

It is therefore desirable to be able to boot an I/O processor from a remote memory, thereby allowing the elimination of that I/O processor's local memory which in prior art systems would have contained the processor's boot code. It is further desirable to provide an apparatus which allows PCI slot expansion without unnecessarily increasing the cost of the host system. The performance of an expanded slot must be maintained at an acceptably high level, and the system should be readily expandable to meet the demands of increasing processor power.

BRIEF DESCRIPTION OF THE DRAWINGS

FIG. 2 is a table of relevant PCI signals for one embodiment of the invention.

SUMMARY OF THE INVENTION

A method and system for booting a first processor from a remote memory is disclosed. In response to a reset signal, a processor which has no associated local memory is prevented from executing code and particularly its boot sequence. Because the first processor is prevented from initializing its environment, configuration cycles from a host processor should be prevented from configuring that environment until the first processor has booted. By preventing the host processor from configuring, the first processor environment's integrity is protected. Because the first processor has no local memory, address cycles generated to access local memory would normally go unclaimed on a local bus. An interface between the local bus and the remote memory is configured to claim the local memory address range from the local bus. Once the first processor is enabled, the local memory addresses are used to access the remote memory to return the necessary boot code.

DETAILED DESCRIPTION OF THE INVENTION

The present invention provides a method and apparatus booting a processor from a remote memory. For the purpose of explanation, specific details are set forth to provide a thorough understanding of the present invention. Notably, the invention is described in the context of PCI buses, however, the invention could also be employed in the context of other bus structures. It will be understood by one skilled in the art that the invention may be practiced without these details. Moreover, well known elements devices, process steps and the like are not set forth in order to avoid obscuring the invention.

Figure 1:
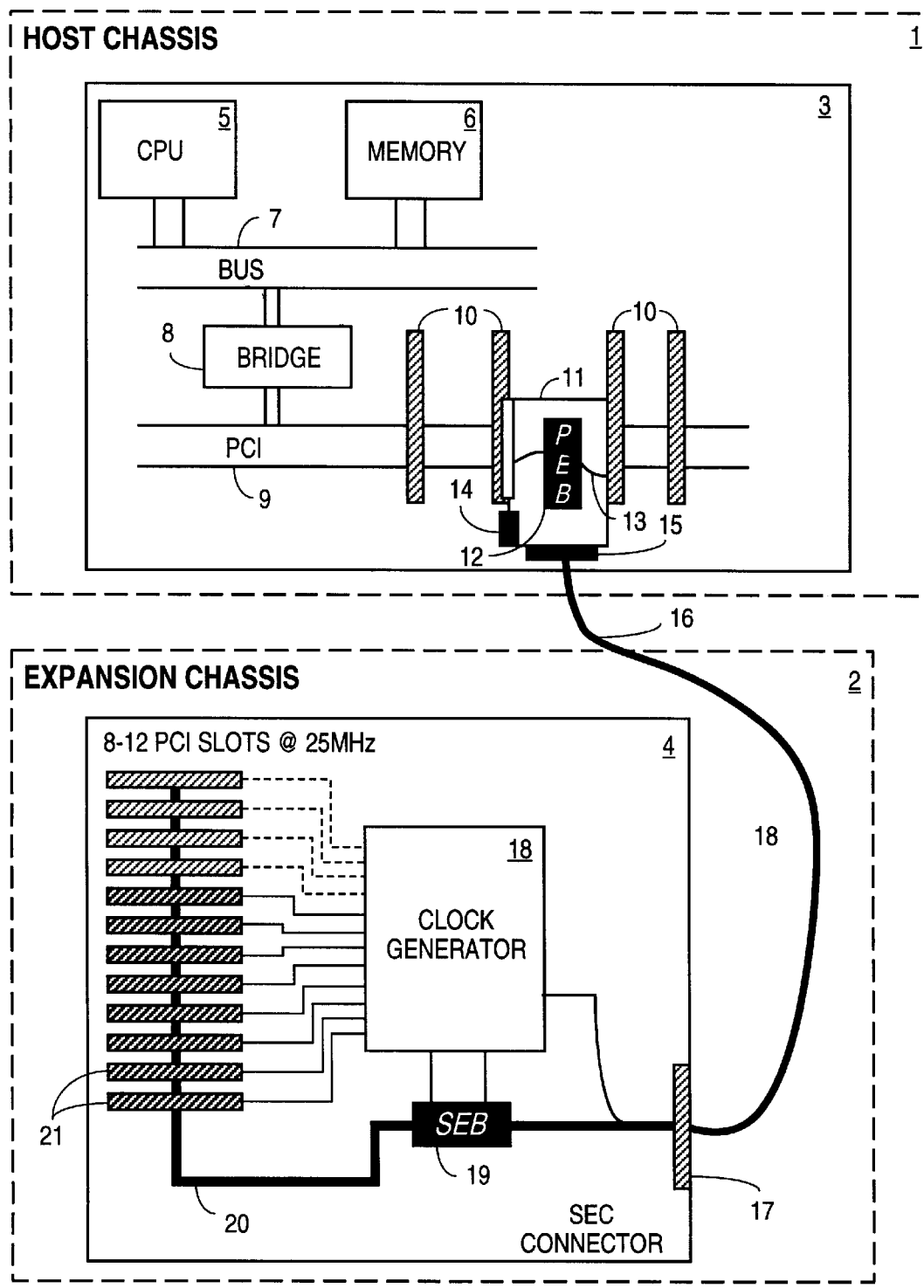
FIG. 1 is a block diagram of a system employing one embodiment of the invention.

FIG. 1 shows a block diagram of a system incorporating the instant invention. The host system resides within a host chassis 1 and includes a host mother board 3. The host mother board has a central processing unit (CPU) 5 connected to a memory 6 by a system bus 7. A bridge 8 is provided on the mother board to bridge between the system bus 7 and a host PCI bus 9. At 33 MHz, the PCI specification only permits 3–4 slots 10 along a single bus segment. By installing an expansion card 11 in at least one of the slots 10 on the host PCI bus 9, it is possible to expand the number of slots of the system as a whole.

The expansion card 11 has a primary expansion bridge (PEB) 12 described more fully with reference to FIG. 3 below, and a cable connector 15. In an exemplary embodiment, a 100 pin cable connector is used. This allows for sufficient signal conductors to accommodate parallel transmission of all PCI required signals and adequate grounding. The expansion card also provides an optional advanced programmable interrupt controller (APIC) connector 14 to allow the card 11 to be connected to the APIC bus (not shown) on the host mother board 3. FIG. 2 is a table of the relevant PCI signals. The cable 16 is selected based on propagation speed down the cable 16 and cable slewing. It is desirable to choose a cable 16 with minimal slewing and with maximum propagation speed. The cable 16 functions as a point to point PCI bus between the expansion side of the PEB 12 and the secondary expansion bridge (SEB) 19 which is described more fully below. The cable 16 should be well terminated at either end with impedances approximately equal to the characteristic impedance in the cable. In an exemplary embodiment, a six foot high performance parallel interface (HIPPI) cable with a characteristic impedance of 88±5 ohms is used. HIPPI cable meets American National Standards Institute (ANSI) standards and includes 50 twisted pairs, thereby providing an adequate number of signal lines. It would be possible to use a smaller cable and lower pin count connector but such would limit possible functionality somewhat.

The expansion chassis 2 contains an expansion mother board 4 to which the cable 16 connects via connector 17. A PCI bus runs from the connector to the SEB 19. The clocking in the expansion system is provided by a clock generator 18 which is asynchronous with and independent of the host clock (not shown). The number of slots 21 available on the secondary PCI bus (SPB) 20 is determined by the speed of the clock signal generated. At 25 MHz, 8–12 slots are available, while at 33 MHz, only 3–4 slots would be available. It is possible and contemplated as within the scope of this invention that multiple expansion modules could be coupled to a single host (one card per available PCI slot). It is also within the scope of the invention to cascade an expansion module off an expansion module.

Figure 3:
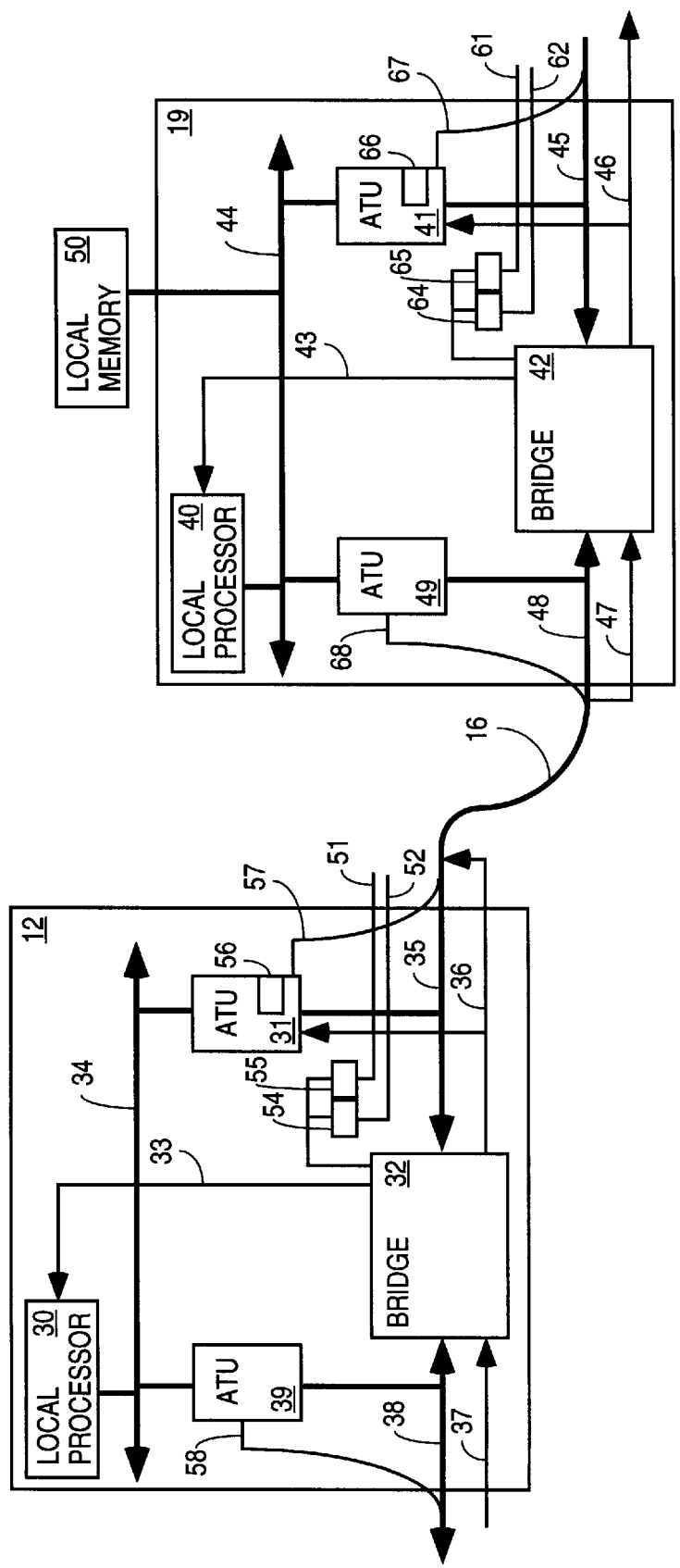
FIG. 3 is a block diagram of the primary and secondary expansion bridges of one embodiment of the invention.

FIG. 3 shows a block diagram of PEB 12 as coupled to the SEB 19 of the instant invention. Local processor 30 is coupled to local bus 34 which is also coupled to primary address translation unit (ATU) 39 and secondary ATU 31. A primary ATU 39 is also coupled to the primary PCI bus 38. The secondary ATU 31 is coupled to the secondary PCI bus 35. Secondary ATU 31 contains programmable bit 56 which can provide a control signal to cause the ATU 37 to change the address range claim from the local bus. Bridge 32 provides a PCI to PCI bridge between primary PCI bus 38 and secondary PCI bus 35. The bridge 32 issues local bus reset (not shown) which resets the devices on the local bus 34.

Primary reset 37 operates as an input signal to the bridge 32 which is passed through to become secondary reset 36 which is cabled over cabled bus 16 to become primary reset 47. Cabled bus 16 also connects secondary PCI bus 35 with primary PCI bus 48. SEB 19 has the same basic structure as PEB 12. Local processor 40 is connected to local bus 44 which in turn is connected to primary and secondary ATUs 49 and 41, respectively. The bridge unit 42 bridges between primary PCI bus 48 and secondary PCI bus 45 and provides the local bus reset 43 to the devices on the local bus. In one exemplary embodiment, local bus 44 is also coupled to a local memory 50. Local memory 50 includes at least some ROM containing initialization code for local processor 40. Local processor 40 initializes itself from the code in local memory and then initializes the components on the local bus 44 in the usual way.

Two programmable bits 54 and 55 are programmed responsive to primary reset 37 by sampling each of two strapping pins while primary reset 37 is asserted. These bits are set and cleared in memory cycles. A retry pin 51 programs the programmable bit 54 to indicate a retry condition to the host until bit 54 is cleared. Core reset pin 52 programs programmable bit 55 to hold the local processor 30 in reset until cleared. It will be recognized by one of ordinary skill in the art that the decision of whether to set/clear to indicate, e.g., retry/no retry, the programmable bits is a design decision and the inverse is within the scope of the invention. Significantly, because the retry pin 51 and the core reset pin 52 are only sampled when primary reset 37 is asserted, these pins can be multiplexed and used for other functions the rest of the time. Since many integrated circuits are pin limited, this pin "saving" is important.

In response to an assertion and deassertion of a reset signal along primary reset line 37, the bridge 32 asserts and deasserts secondary reset signal 36 which corresponds to an assertion and deassertion of primary reset signal 47 and to bridge 42. Additionally, the bridge asserts local bus reset (not shown) which resets all devices on the local bus. However, to prevent the local processor 30 from beginning its initialization cycles, core processor reset 33 is maintained asserted because bit 55 remains set. Local processor 40 begins initialization responsive to deassertion of local bus reset signal 43. Thus, when reset signal 43 is deasserted, local processor 40 will place the address of its initialization code as located in local memory 50 onto the local bus 44. Local memory 50 will then provide the necessary initialization routines across local bus 44 to processor 40 and local processor 40 will initialize the other units on local bus 44.

The host processor will try to configure the PEB 12 and SEB 19 by sending configuration cycles through the primary interface of the PEB. The bridge 32 forwards the configuration cycles directed to the primary PCI 48 of the SEB 19. Configuration cycles in PCI are permitted only when an ID select (IDSEL) signal is asserted. The IDSEL signal is typically tied to particular address lines of the PCI bus which ensure that it will be asserted if the cycle is a configuration cycle. Primary IDSELs 58 and 68 are asserted for configuration cycles within the PEB 12 and SEB 19, respectively.

With programmable bit 54 set, host processor configuration cycles are prevented from entering the PEB 12. Specifically, when host configuration cycles appear on primary PCI bus 38, the bridge 32 asserts a retry signal. The retry signal indicates that the target (in this case the PEB 12) is not ready to receive the cycles from the host processor. As a result, the host processor releases the primary PCI bus 38 for a period of time and then comes back and attempts drive configuration cycles into the PEB 12. The retry signal requires the host to come back, but there is no limit to the number of times the host processor can be forced to retry. Thus, programmable bit 54 causes the host processor to be retried indefinitely until programmable bit 54 is cleared.

Once the local processor 40 of SEB 19 has initialized the local bus 44, it sets programmable bit 56 in secondary ATU 31 to claim a new address range from local bus 34. This setting is performed by a configuration cycle through the secondary PCI bus 35 of the PEB 12. To allow configuration cycles along the PEB's secondary PCI bus 35, a secondary IDSEL signal 57 is provided. The secondary IDSEL is asserted to allow the setting or clearing of programmable bit 56. The SEB 19 is shown with a secondary IDSEL 67 which is unused in the configuration shown.

Claiming of the new address range is discussed more fully below with reference to FIG. 4. Once bit 56 is set, SEB local processor 40 clears programmable bit 55 via a memory cycle, which causes the reset of local processor 30 to be deasserted. Local processor 30 puts out initialization cycles on local bus 34 which are claimed by secondary ATU 31 because programmable bit 56 is set. The secondary ATU 31 converts these local bus addresses to PCI addresses and forwards them on secondary PCI bus 35. Primary ATU 49 claims these PCI addresses and translates them to the local bus 44 where they are claimed by local memory 50. Local memory 50 then forwards the necessary initialization code to local processor 30 in the PEB 12. Once local processor 30 has booted and initializes the components local bus 34, SEB local processor 40 clears programmable bit 56 returning secondary ATU 31 to claiming its normal address range. PEB local processor 30 then clear programmable bit 54 so that on the next attempt, host configuration cycles will be allowed to enter the PEB.

While FIG. 3 shows the PEB and the SEB having the same architecture, the invention is not so limited. For example, a local memory and processor could be provided on the SEB primary PCI bus, thereby obviating the need for the SEB primary ATU in this invention. If the PEB were provided with an additional strapping pin to program programmable bit 56, the PEB local processor could boot from a remote memory in the SEB without the aid of an SEB local processor. Thus, with such additional strapping pin, the PEB processor could boot from a memory on the SEB primary PCI bus without additional support from other SEB components. It is also possible for additional devices to reside on either the local bus, one of the PCI buses, or both without departing from the scope and contemplation of the invention. Notably, it is envisioned that the invention can be used with the architecture described in i960® RP Microprocessors Users Manual available from Intel Corporation publications division.

Figure 4:
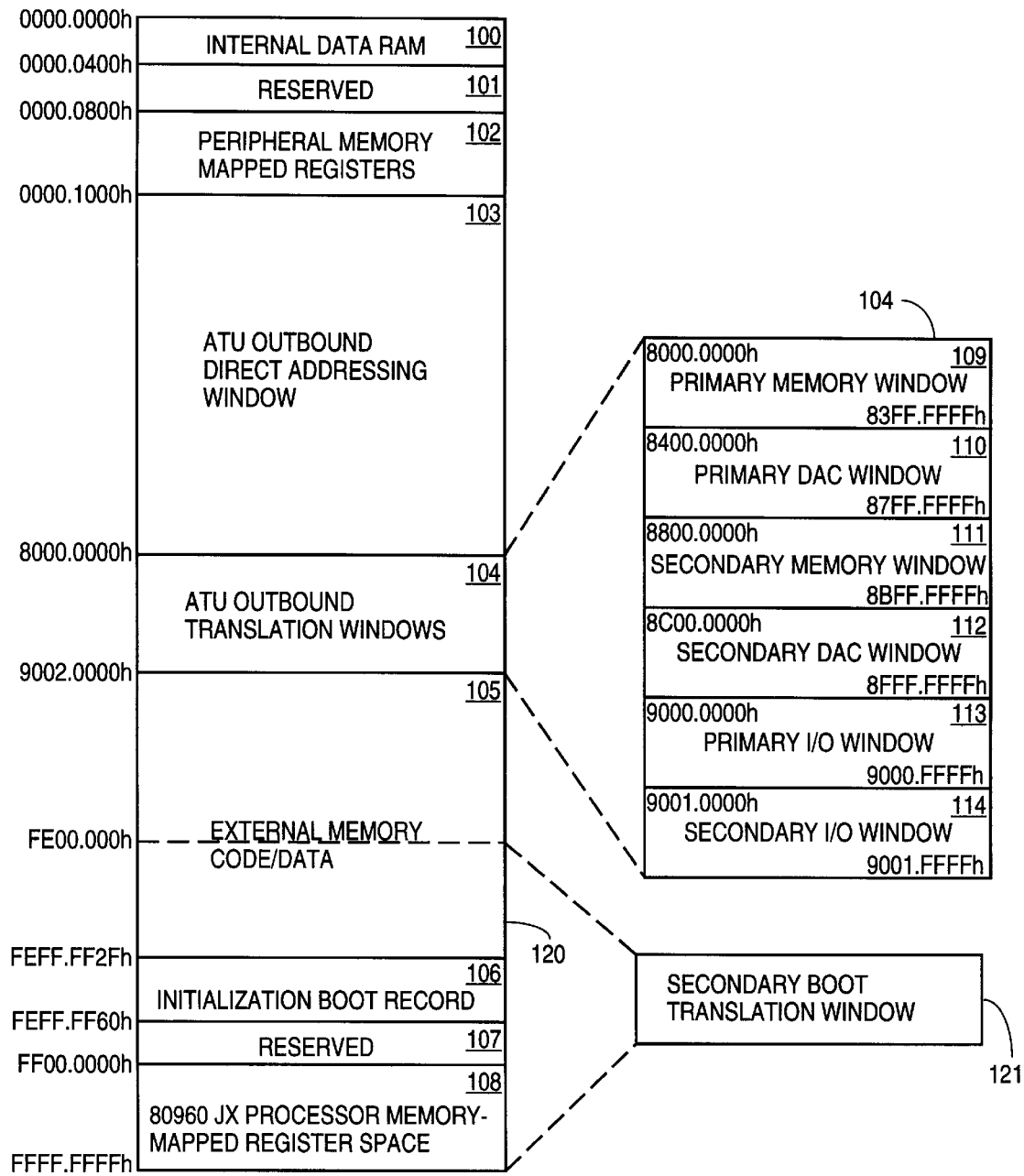
FIG. 4 is a diagram of memory mapping for one embodiment of the invention.

FIG. 4 shows a local bus address space for one embodiment of the invention. The outbound translation windows 104 have been shown in an exploded view. The local bus address space is divided in seven functional regional and two reserved regions 101, 107. The functional regions include internal data RAM 100, peripheral memory mapped registers 102, ATU outbound direct addressing 103, ATU translation 104, external memory code and data 105, initialization boot record 106, and 80960 JX processor memory mapped register space 108.

The invention deals primarily with the ATU outbound translation windows 104, and the secondary boot translation window 121. There are six outbound ATU translation windows, three each corresponding to the primary and secondary ATU's. The six windows are Primary Memory Window 109, Primary Dual Address Cycle (DAC) window 110, primary I/O window 113 and corresponding secondary windows 111, 112, and 114, respectively.

In one embodiment of the instant invention, the address range claimed for ATU translation is modified to allow the secondary ATU to claim and translate addresses in the secondary boot translation window 121.

Addresses falling within the outbound translation windows 111, 112, and 114 are claimed by the secondary ATU in the course of normal operation and translated to a PCI address in a standard way. However, when bit 56 in the secondary ATU is set, the secondary ATU also claims an additional window 121. The additional window 121 claimed includes a portion of external memory code/data 105, the initialization boot record 106, reserved block 107, and the memory mapped register space 108 at FE00.0000 through FEFF.FFFFF. Unless this programmable bit 56 is set, addresses within the initialization boot record 106 and external memory window 120 placed on the local bus would go unclaimed as there is no local memory which would normally respond to this address range. It is not necessary to claim windows 107 and 108 and the ATU could be configured to claim all of external memory code/data window 105. But establishing the secondary boot window 121 as discussed above simplifies decoding and implementation as 1) any address above FE000000 is claimed, thus obviating the need to check for an upper end, and 2) the number of address bits decoded is reduced over claiming the expanded range. Nevertheless, embodiments claiming a larger window and those with an upper end limit are within the scope and contemplation of the invention. Once the secondary ATU claims an address of this secondary boot translation window 121, that address is translated to a PCI address and forwarded over the cabled bus to the SEB and appropriate initialization information will be returned as discussed previously.

In the foregoing specification, the invention has been described with reference to specific embodiments thereof. It will however be evident that various modifications and changes may be made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

What is claimed is:

1. A method of booting a first processor from a remote memory unit comprising the steps of:

disabling the first processor from executing code;

preventing a host processor from configuring an environment of the first processor; and configuring an interface unit between the first processor and the remote memory to claim a local bus address range corresponding to a local memory address range from the local bus, including loading a value in a register which causes the interface to translate addresses in a predetermined way and setting a programmable bit, the set bit causing the interface to claim an address range corresponding to the local memory address range from the local bus.

2. The method of claim 1 further comprising enabling the first processor to execute code; and transparently retrieving boot code from the remote memory to boot the first processor.

3. The method of claim 2 wherein the step of enabling comprises the step of:

deasserting a reset signal to the first processor.

4. The method of claim 1 wherein the step of disabling comprises the steps of:

receiving a reset signal; and maintaining a processor reset signal to the first processor.

5. The method of claim 4 wherein the step of disabling further comprises the step of:

setting a bit in a control register.

6. An apparatus comprising:

a first processor coupled to a local bus;

a bridge electrically isolating a first and a second bus;

an address translation unit coupled between the second bus and the local bus;

a programmable bit such that when the bit is set to a predetermined value, the address translation unit claims cycles directed to a local memory; and means for preventing access to the apparatus by configuration cycles of a host processor.

7. The apparatus of claim 6 wherein the means for preventing comprises a state machine having a retry state which issues a retry command to the second processor, the retry state being entered any time a retry signal is asserted simultaneous with a primary reset signal.

8. The apparatus of claim 6 further comprising:

means for disabling the first processor from executing any code.

9. The apparatus of claim 8 wherein the means for disabling is a control register which maintains a reset signal to the processor until a predetermined bit is cleared.

10. An apparatus comprising:

a first processor coupled to a local bus;

an address translation unit (ATU) coupled between the local bus and an I/O bus, the ATU claiming one of a first address range or second address range from the local bus wherein the first address range corresponds to outbound I/O transactions and the second address range corresponds to local memory transactions, the second address range claimed responsive to setting a programmable bit; and a control register which holds the first processor in reset as long as a first predetermined bit is set, the register preventing a host processor configuration cycle from entering the apparatus while a second predetermined bit is set.

11. The apparatus of claim 10 wherein the control register is disposed in a bridge unit, the bridge unit bridging between a primary I/O bus and a secondary I/O bus.

12. A system comprising:

a first processor environment having no boot memory and a second processor environment having a boot memory, the first and second environments coupled together by a cabled bus; wherein the first and second environments each include:

a processor coupled to a local bus;

a bridge coupled between a first and a second bus;

an address translation unit coupled between the first bus and the local bus;

a second address translation unit coupled between the local bus and the second bus;

and wherein the second processor sets a programmable bit in the first processor environment causing the second address translation unit of the first environment to claim an address range including boot cycles of the first processor.

13. The system of claim 12 wherein a state machine prevents a host processor configuration cycle from entering the first processor environment until the first processor has fully booted.

14. The system of claim 12 wherein a state machine maintains a processor reset signal to the first processor until the second processor environment is fully booted.

* * * * *